(12) United States Patent
Allen et al.

(10) Patent No.: US 7,836,591 B2
(45) Date of Patent: Nov. 23, 2010

(54) METHOD FOR FORMING TURBINE SEAL BY COLD SPRAY PROCESS

(75) Inventors: David B. Allen, Oviedo, FL (US); Ramesh Subramanian, Oviedo, FL (US)

(73) Assignee: Siemens Energy, Inc., Orlando, FL (US)

( * ) Notice: Subject to any disclaimer, the term of this patent is extended or adjusted under 35 U.S.C. 154(b) by 1500 days.

(21) Appl. No.: 11/082,414

(22) Filed: Mar. 17, 2005

(65) Prior Publication Data

US 2006/0207094 A1    Sep. 21, 2006

(51) Int. Cl.
 *B23P 6/00* (2006.01)
(52) U.S. Cl. .............................. 29/888.021; 29/888.01; 29/888.02; 277/412; 277/415; 415/173.4; 427/142; 427/191; 427/404
(58) Field of Classification Search .... 29/888–888.025, 29/889–889.1; 416/92, 193 A; 277/412, 277/415; 415/173.4; 228/119; 427/404, 427/191, 142
See application file for complete search history.

(56) References Cited

U.S. PATENT DOCUMENTS

| | | | |
|---|---|---|---|
| 3,701,536 A * | 10/1972 | Matthews et al. | 277/415 |
| 3,876,330 A * | 4/1975 | Pearson et al. | 416/92 |
| 4,743,164 A * | 5/1988 | Kalogeros | 416/193 A |
| 5,302,414 A | 4/1994 | Alkhimov et al. | |
| 5,314,304 A * | 5/1994 | Wiebe | 415/173.4 |
| 5,785,492 A | 7/1998 | Belsom et al. | |
| 6,039,535 A | 3/2000 | Kobayashi et al. | |
| 6,089,828 A | 7/2000 | Hollis et al. | |
| 6,270,849 B1 * | 8/2001 | Popoola et al. | 427/404 |
| 6,358,002 B1 | 3/2002 | Good et al. | |
| 6,365,222 B1 | 4/2002 | Wagner et al. | |
| 6,444,259 B1 | 9/2002 | Subramanian et al. | |
| 6,464,453 B2 | 10/2002 | Toborg et al. | |
| 6,481,959 B1 | 11/2002 | Morris et al. | |
| 6,491,208 B2 * | 12/2002 | James et al. | 228/119 |
| 6,558,114 B1 | 5/2003 | Tapley et al. | |
| 6,602,545 B1 * | 8/2003 | Shaikh et al. | 427/191 |
| 6,706,319 B2 | 3/2004 | Seth et al. | |
| 6,751,863 B2 | 6/2004 | Tefft | |
| 6,752,589 B2 | 6/2004 | Vogan et al. | |
| 6,780,458 B2 | 8/2004 | Seth et al. | |
| 6,905,728 B1 * | 6/2005 | Hu et al. | 427/142 |

* cited by examiner

*Primary Examiner*—Rick K Chang

(57) ABSTRACT

A method of forming an interstage seal including removing a diaphragm seal box (14) from a gas turbine compressor assembly (10) and removing a labyrinth sealing member (12) from the diaphragm seal box (14). An abradable material layer (34) may be deposited on the diaphragm seal box (14). A spray gun may be mounted in relation to an engine disk (16) of the gas turbine compressor assembly (10) for cold-spraying a quantity of particles toward the engine disk (16). The particles may be sprayed at a velocity sufficiently high to cause at least a portion of the quantity of particles to adhere to the engine disk (16). The spray gun may be controlled to deposit a quantity of particles on the compressor disk (16) to form a geometry (32) that will abrade the abradable material layer (34) during operation of the gas turbine compressor assembly (10). The geometry (32) abrading the abradable material layer (34) forms an interstage seal. Rotation of the engine disk (16) within the gas turbine compressor assembly (10) may be controlled during the step of controlling the spray gun. The diaphragm seal box (14) may be reinstalled within the gas turbine compressor assembly (10) so that the geometry (32) aligns with the abradable material layer (34).

17 Claims, 3 Drawing Sheets

METHOD FOR FORMING TURBINE SEAL BY COLD SPRAY PROCESS

FIELD OF THE INVENTION

This invention relates generally to the field of materials technologies, and more specifically to the field of retrofitting a turbine assembly to form a seal between a rotating and a stationary component by applying material to the rotating component using a cold spray technique.

BACKGROUND OF THE INVENTION

Certain combustion turbine engines such as the W501F/G engines manufactured by the assignee of the present invention use metal labyrinth seal strips affixed to and extending from a stationary diaphragm carrier. The metal strips rub against rotating compressor disks to reduce interstage leakage. The metal strips tend to mushroom or flatten due to rubbing. This produces rounded seal surfaces that reduce sealing efficiency. This rubbing may also produce metallic debris that can damage downstream airfoils. To avoid this problem, clearances between the metal strips and compressor disks may be increased. However, this also reduces the interstage sealing efficiency and degrades the overall performance of the combustion turbine engine.

DETAILED DESCRIPTION OF THE INVENTION

An improved sealing geometry has been developed that utilizes a circumferential metal sealing feature on a rotating disk and an abradable material on a stationary sealing surface, which in an embodiment may be a diaphragm carrier. One aspect of the invention provides a method for retrofitting or upgrading combustion turbine engines in the factory or in the field to create a more efficient interstage seal within the compressor. An embodiment of the method allows for an abradable coating to be deposited on a diaphragm carrier using a conventional thermal spray technique or by attaching a monolithic abradable to the diaphragm carrier. A cold spray process may then be used to deposit one or more narrow, sharply profiled ridges around the circumference of a compressor disk so that when the compressor is reassembled the ridge or ridges will abrade the abradable coating during operation of the engine to effect an interstage seal.

Figure 1:
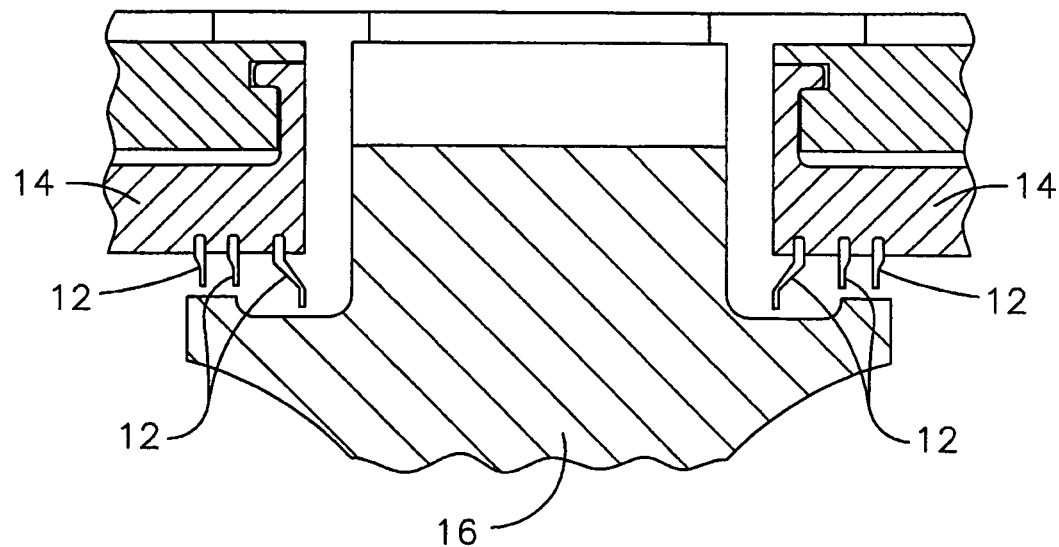
FIG. 1 illustrates a partial cross section of a prior art arrangement of forming an interstage seal within the compressor of a combustion turbine.

FIG. 1 illustrates a prior art arrangement of forming a seal within a multi-stage compressor 10 of a gas turbine engine, the components of which will be recognized by those skilled in the art. A plurality of labyrinth sealing members 12 may be affixed to a stationary member of compressor 10 such as a diaphragm seal box 14. Sealing members 12 may be aligned axially to oppose respective portions of an engine disk 16 to form an interstage seal there between. A plurality of compressor blades (not show) may be affixed to and extend radially from disk 16. Sealing members 12 may be formed of metal and their respective distal ends will rub against respective portions of disk 16 during operation of compressor 10. This rubbing deforms the ends of sealing members 12, eventually degrading the sealing capacity between seal box 14 and disk 16. The deformed seal material is also known to detach from sealing members 14, producing debris that may enter compressor 10 and damage downstream components.

Figure 2:
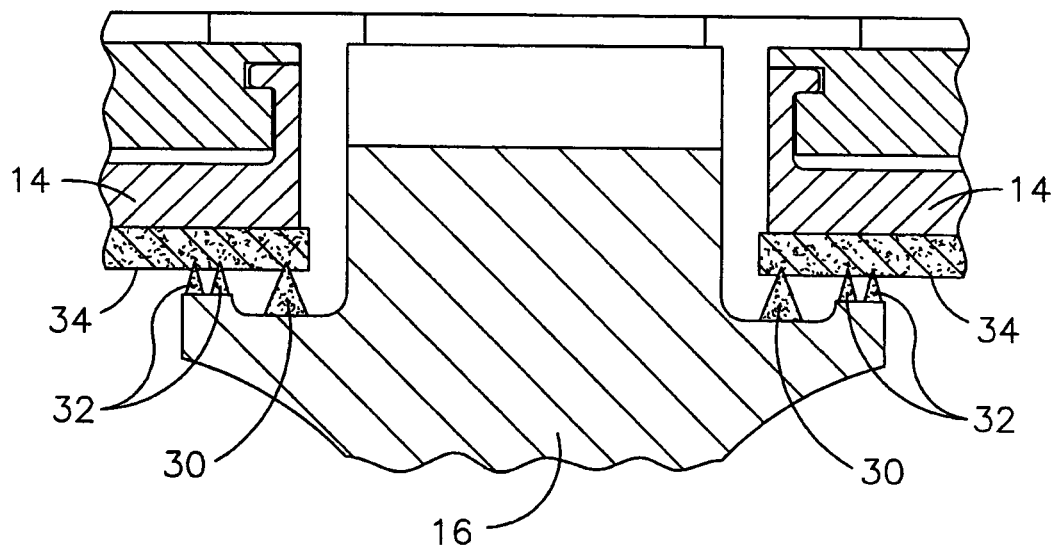
FIG. 2 illustrates a partial cross section of the compressor of FIG. 1 with a seal formed by an exemplary embodiment of the invention.

FIG. 2 illustrates an embodiment of the invention wherein a plurality of geometries, such as inner geometries 30 and outer geometries 32 extend radially from a rotating engine disk 16 toward a stationary, mating component such as a vane carrier or diaphragm seal box 14. Geometries 30, 32 may be formed in a variety of geometrical shapes that create a relatively sharp peak at their distal end. In an embodiment geometries 30, 32 are substantially triangular with a height-to-width ratio of approximately 2-to-1. Geometries 32 may have dimensions of approximately 6-7 mms in height and 2-3 mms in width at the base. Alternate height-to-width ratios and dimensions may be used as a function of spacing between seal box 14 and disk 16, radial displacement of geometries 30, 32 during operation of compressor 10 and the desired effectiveness of a seal formed between seal box 14 and disk 16.

Various spray processes may be used to deposit an abradable material onto a substrate as recognized by those skilled in the art. Aspects of the invention allow for an abradable material layer 34 to be applied to a stationary component of compressor 10 such as diaphragm seal box 14. The abradable material layer 34 may be any such material known in the art. In an embodiment for use in compressor 10 the abradable material layer 34 may be about 75% nickel and about 25% graphite, with the nickel being clad over graphite flakes. Alternate embodiments allow for these percentages to vary and other types of abradable material may be used depending on the application. For example, a porous 8YSZ layer may be used in direct turbine applications, monolithic abradable materials, such as Feltmetal seal material for compressor 10 applications, and a metal honeycomb for compressor 10 or turbine applications.

Industrial gas turbines such as the W501F/G engine, W501D/251 upgrades and V84/94 sold by the assignee of the present invention having a configuration of FIG. 1 have been in use in the field for many years. Consequently, the seal formed between seal box 14 and disk 16 has degraded in some of these engines and their upgrading or refurbishing may be necessary. Also, the current design of these engines using labyrinth sealing members 12 made of metal strips does not allow for optimizing clearance control between seal box 14 and disk 16 for maximizing the sealing effectiveness.

In this respect, the inventors of the present invention have determined that introducing geometries 30, 32 onto disks 16 and an abradable material layer 34 to the surface of seal box 14 allows for retrofitting compressor 10 rather than replacing components. The geometries 30, 32 engage abradable material layer 34 during operation of combustor 10. This allows for improved clearance control between seal box 14 and disk 16, increasing sealing effectiveness. It has been determined that applying an abradable material layer 34 and respective geometries 30, 32 in this orientation reduces interstage seal leakage, which improves overall performance of the gas turbine engine resulting in significant cost savings. Sealing members 12 may be removed from seal box 14 to allow for layer 34 to be deposited.

The thickness of layer 34 may be a function of the maximum thermal deflection expected in that part of a combustion turbine engine where layer 34 is applied. For example, if the engine disk 16-to-seal box 14 distance changes by 1 mm during operation an approximately 1 mm or slightly greater thickness of abradable material layer 34 may be applied. Exemplary embodiments may have a 2.5 mm thickness of layer 34 for compressor blade rings and a 1 mm thickness for turbine ring segments.

The inventors have determined that a cold spray process may be used to produce geometries 30, 32 having narrow, triangular profile ridges to form "knife-edges" for cutting into abradable material layer 34 during operation of combustor 10. U.S. Pat. No. 5,302,414 dated Apr. 12, 1994, which is incorporated herein by reference, and re-examination certificate U.S. Pat. No. B1 5,302,414 dated Feb. 25, 1997, describe a cold gas-dynamic spraying process for applying a coating, also referred to herein as cold spraying. That patent describes a process and apparatus for accelerating solid particles having a size from about 1-50 microns to supersonic speeds in the range of 300-1,200 meters per second and directing the particles against a target surface. When the particles strike the target surface, the kinetic energy of the particles causes plastic deformation of the particles and a bond is formed between the particles and the target surface and between the incoming particles and the previously deposited particles. This process forms a dense coating with little or no thermal effect on the underlying target surface, which is an important advantage when applied to heat treated substrates.

Unlike conventional thermal spray techniques, cold spray relies almost entirely upon the high velocity of the impinging particles to create dense coatings, thus imparting very little heat to the substrate material. This technique allows for disk 16 applications in accordance with the invention since disks 16 are heat treated for high strength and ductility. Any excess heating of the disk 16 surface could compromise the desirable material properties.

Figure 3:
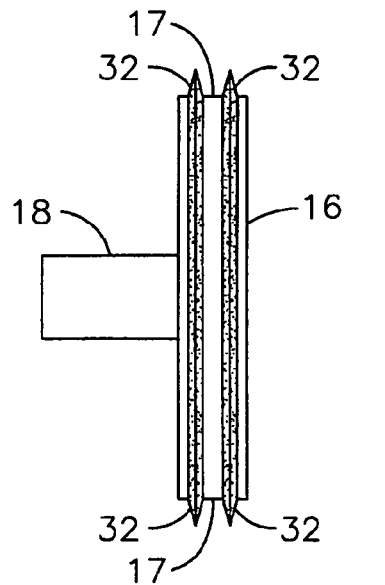
FIG. 3 illustrates a side view of a compressor disk having two circumferential ridges deposited thereon in accordance with aspects of the invention.
Figure 4:
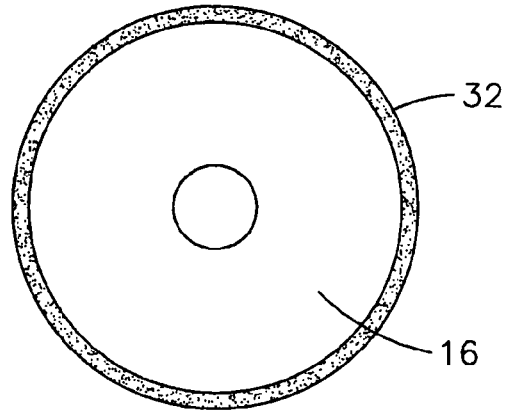
FIG. 4 illustrates a planar view of the disk of FIG. 3.

An aspect of the invention allows for forming one or more geometries or ridges 30, 32 around an outside diameter 17 of disk 16 as best shown in FIGS. 3 and 4. FIG. 3 shows a pair of spaced apart, parallel ridges 32 that may be formed by cold spraying a quantity of particles onto the outside diameter 17 of an exemplary disk such as disk 16. FIG. 4 shows ridges 32 circumferentially disposed around disk 16.

Figure 5:
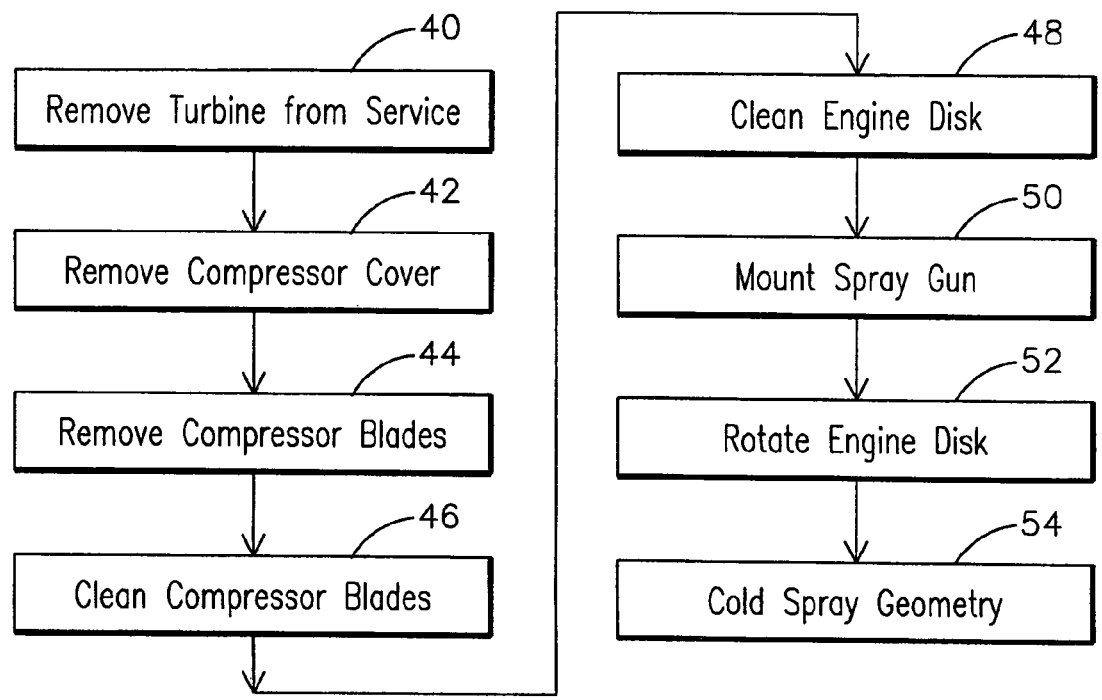
FIG. 5 is a flow diagram of an exemplary method in accordance with aspects of the invention.

FIG. 5 illustrates a method aspect of the invention that allows for retrofitting an interstage seal of a gas turbine compressor 10. Gas turbine compressor 10 may be removed from service at step 40 such as for routine maintenance/upgrade or for specifically retrofitting the interstage seal. A compressor cover (not shown) may be removed at step 42 so that the compressor blades (not shown) may be removed at step 44. Step 46 allows for the compressor blades 16 to be chemically cleaned with a conventional solvent to remove any residual oils or greases from machining processes or engine service. Disk 16 may be cleaned at step 48 such as with conventional solvents and/or by grit blasting with particles such as alumina or silicon carbide a surface area to which ridges 30, 32 will be bonded. A spray gun for cold spraying particles may be mounted in fixed relation to compressor disk 16 at step 50. The spray gun may be mounted and controlled so that a spray nozzle may traverse outer diameter 17 of engine disk 16 to deposit one or a plurality of ridges 30, 32.

Step 52 allows for engine disk 16 to be rotated such as by rotating a rotor on a timing gear in the combustor 10 assembly. The rotational speed of engine disk 16 may be controlled in conjunction with the spray gun to cold-spray geometries or ridges 30, 32 onto outer diameter 17 at step 54. An aspect of the invention allows for an exemplary geometry, such as a ridge 32, to be formed on outer diameter 17 by making successive passes of the spray gun around the circumference of outer diameter 17 to deposit adjacent layers of a cold-sprayed material. Successive passes may be used to deposit successive layers of cold-sprayed material on top of previously deposited layers of material.

Figure 6:
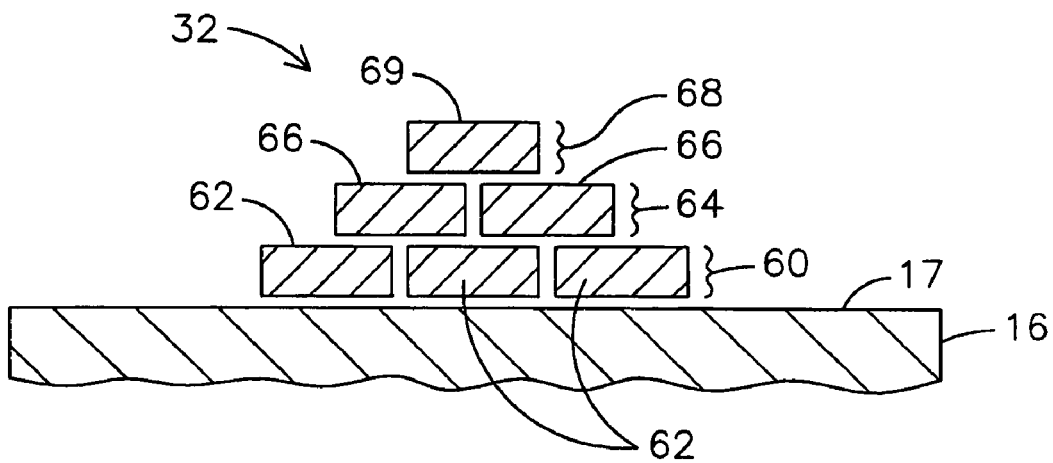
FIG. 6 is a schematic of how a narrow triangular profile ridge geometry may be formed in accordance with aspects of the invention.

In this respect, FIG. 6 shows schematically how successive passes of the spray gun may form a ridge 32. By way of example, a first layer of cold-sprayed material 60 may be formed by three successive passes of the spray gun around the circumference of engine disk 16 to deposit adjacent rows of material 62 on outer diameter 17. The rotational speed of engine disk 16 may be controlled simultaneously with the spray gun parameters to achieve a desired shape and/or material properties of each adjacent row 62, which are shown as rectangular for illustration purpose. The inventors have determined that controlling the rotational speed or traverse rate of engine disk 16 in conjunction with the spray gun parameters allows for forming ridge 32 having the desired geometry and material properties. Controlling the rotational speed allows for controlling the dwell time of the spray gun at locations around the circumference of engine disk 16 to form ridge 32.

FIG. 6 illustrates that successive passes of the spray gun may be controlled to form a successive second layer of cold-sprayed material 64 by depositing adjacent rows of material 66. A successive third layer of cold-sprayed material 68 may be deposited as a single row of material 69 on top of second layer 64 to form ridge 32. It will be appreciated that the schematic of FIG. 6 illustrates that the spray gun may be controlled to make successive passes around the circumference of engine disk 16 to deposit adjacent rows of cold-sprayed material and successive layers on top of one another.

The number of passes of the spray gun during cold-spray deposition to deposit adjacent rows per layer 60, 64, 68, dwell time of the spray gun at various locations during each pass and the number of layers 60, 64, 68 formed may vary as a function of the desired configuration, dimensions and material properties of geometry 30, 32. For example, an alternate embodiment may include two passes of the spray gun to deposit adjacent rows 62 forming first layer 60, one pass to deposit second layer 64 and two passes depositing adjacent rows forming top layer 68. Alternate combinations of passes per layer and number of layers are contemplated by the present invention to achieve a wide range of geometries 30, 32.

Figure 7:
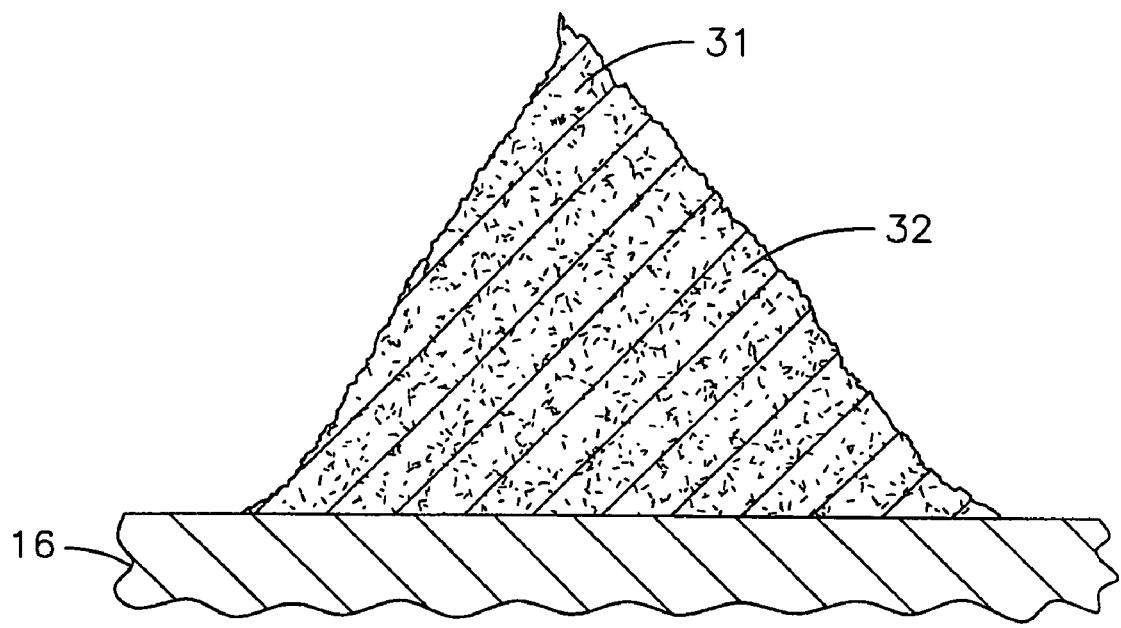
FIG. 7 illustrates an exemplary geometry deposited in accordance with aspects of the invention.

FIG. 7 shows a cross section of an exemplary geometry 30, 32 cold-spray deposited on a substrate by the inventors of the present invention. The cold-sprayed particles may have the exact chemical composition as that of the target substrate such as engine disk 16. This helps to ensure the deposited materials are sufficiently bonded to engine disk 16. The inventors have utilized the cold-spray process to produce a very narrow profile proximate a distal end 31 of ridge 32, which forms a desirable "knife-edge" that is beneficial in forming an efficient interstage seal within compressor 10 when the distal end 31 cuts into abradable material layer 34. In another embodiment the cold-sprayed particles may be a harder material than the disk 16 material to create a very hard ridge surface that will more effectively abrade the abradable layer 34 for certain applications. Such an embodiment may be necessary if the engine operates in an environment that contains a large fraction of erodent particles that could erode a softer abradable material. Testing conducted by the inventors is presented in the examples below.

EXAMPLE 1

In this example, parallel ridges, such as ones used to form ridges 32 shown in FIG. 3, of 316L stainless steel were sprayed onto a flat plate of 4340 steel using a cold-spray technique. The spray conditions were varied slightly between ridges and the efficacy of each spray condition was evaluated by later cutup and metallography of the sprayed ridges. The spray conditions used for each ridge are listed in Table 1. A commercial 316L stainless steel powder with a sieve size predominantly between 11 and 38 microns was used for all spray trials.

TABLE 1

Cold Spray Conditions[†]

| Ridge # | Gun Traverse Rate (meters/minute) | Number of Passes | Measured Particle Velocity (meters/second) |
|---|---|---|---|
| 1 | 18.7 | 150 | 610-740 |
| 2 | 9.5 | 100 | 610-740 |

[†]Common spray conditions were as follows:
Nitrogen pressure: 3.25 MPa
Nitrogen temperature: 550° C.
Nitrogen flow rate: 85 cubic meters/hour
Gun nozzle exit diameter: 6.4 mm The gun was translated 150 microns laterally after each subsequent pass to deposit the next pass (i.e., the step size was 150 microns). The ridges that were produced were shown to be fully dense near the centerline, becoming slightly porous near the outside edges. This was due to the central material being "peened" more fully by subsequent passes, whereas the outside material in each ridge had fewer overlapping passes. For example, with respect to ridge #1 above, the central material or peak of the ridge was formed with 150 passes whereas the sides of the ridge were formed with less than 150 passes. The aspect ratio of the ridges formed was approximately 1:1. A higher aspect ratio, such as 2:1 for example, could be achieved by using fewer lateral steps.

EXAMPLE 2

In this example, two concentric ridges, such as ones used to form ridges 32 in FIG. 3, of 316L stainless steel were sprayed onto a 15 cm diameter disk of 4340 steel using a cold-spray technique. The spray conditions were varied slightly for each ridge, with the conditions used listed in Table 2. A commercial 316L stainless steel powder with a sieve size predominantly between 11 and 38 microns was used for all spray trials.

TABLE 2

Cold Spray Conditions[†]

| Ridge # | Gun Traverse Rate (meters/minute) | Number of Passes | Measured Particle Velocity (meters/second) |
|---|---|---|---|
| 1 | 44 | 450 | 580-730 |
| 2 | 31 | 300 | 580-730 |

[†]Common spray conditions were as follows:
Nitrogen pressure: 3.25 MPa
Nitrogen temperature: 550° C.
Nitrogen flow rate: 85 cubic meters/hour
Gun nozzle exit diameter: 6.4 mm The gun was translated 150 microns laterally after each subsequent pass to deposit the next pass (i.e., the step size was 150 microns). No cutup or metallography was done on the ridges deposited onto the disk, but the cold-sprayed triangular ridges appeared visibly similar to those applied to the flat plate in Example 1.

The coated disk was then used to evaluate the ability of the cold-sprayed ridges to cut into a representative abradable material such as one used to form abradable material layer 34. The abradable material selected was 75/25 nickel/graphite (a commercially available material comprised of 75 wt % graphite flakes electrolytically coated with 25 wt % nickel). A flame spray technique was used to apply a 3 mm thick nickel/graphite coating onto carbon steel plate material substrates. These coated substrates were then held in the tool holder of a commercial lathe. The disk with the two ridges was chucked into the lathe and spun at 1450 rpm, corresponding to a surface speed of 27,300 inches per minute. This was chosen because it was equivalent to a W501F engine disk speed of 150 rpm. The coated plate was fed into the spinning disk at a rate of 0.125 millimeters per second, for a total incursion depth of 2 mm. Two parallel, clean, full depth cuts were produced in the nickel/graphite coating and no wear or visible damage was detected on the cold-sprayed ridges. This demonstrates that the proposed invention may be used effectively to achieve an optimum clearance between diaphragm seal box 14 and engine disk 16.

Embodiments of the invention may be utilized in a wide range of applications where it is desirable to form a seal between two components moving relative to one another such as in many configurations of industrial gas turbines or other such engines used in aerospace, for example. Other applications will be recognized by those skilled in the art.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

We claim as our invention:

1. A method comprising:
   depositing an abradable material layer on a diaphragm seal box of a gas turbine compressor assembly;
   cold-spraying a quantity of particles toward an engine disk of the gas turbine compressor assembly at a velocity sufficiently high to cause at least a portion of the quantity of particles to adhere to the engine disk to form a geometry that will abrade the abradable material layer during operation of the gas turbine compressor assembly to form an interstage seal; and
   forming the geometry with a number of layers selected to cause the geometry to be fully dense near its centerline due to a peening action of subsequent ones of the layers.

2. The method of claim 1 further comprising:
   the step of removing the diaphragm seal box from the gas turbine compressor assembly is performed prior to the step of depositing; and
   removing a plurality of labyrinth sealing members from the diaphragm seal box prior to the step of depositing.

3. The method of claim 1 further comprising:
   the step of removing the diaphragm seal box from the gas turbine compressor assembly is performed prior to the step of depositing;
   depositing the abradable material layer on an inside circumference of the diaphragm seal box; and controlling the rotation of the engine disk during the cold-spraying to form the geometry comprising a substantially triangular cross section.

4. The method of claim 1 further comprising:
controlling the rotation of the engine disk during the cold-spraying to form the geometry comprising a substantially triangular cross section.

5. The method of claim 4, the geometry comprising a height-to-width ratio of approximately 2-to-1.

6. The method of claim 4, the geometry comprising a height of about 6 to 7 millimeters and a width of about 2 to 3 millimeters.

7. The method of claim 1 further comprising:
controlling the rotation of the engine disk during the cold-spraying to form the geometry comprising at least two parallel ridges around an outer circumference of the engine disk, each of the at least two parallel ridges comprising a substantially triangular cross section.

8. The method of claim 7, each of the at least two parallel ridges comprising a height-to-width ratio of approximately 2-to-1.

9. The method of claim 7, each of the at least two parallel ridges comprising a height of about 6 to 7 millimeters and a width of about 2 to 3 millimeters.

10. The method of claim 1 further comprising:
removing the diaphragm seal box from the gas turbine compressor assembly prior to the step of depositing;
mounting a spray gun in fixed relation to the engine disk for cold-spraying the quantity of particles toward the engine disk; and
controlling rotation of the engine disk mounted within the gas turbine compressor assembly during the step of cold-spraying.

11. The method of claim 10 further comprising:
the rotation of the engine disk during controlling the cold-spraying to form the geometry comprising a substantially triangular cross section, at least one ridge formed around an outer circumference of the engine disk.

12. A method comprising:
removing a diaphragm seal box from a gas turbine compressor assembly; removing a labyrinth sealing member from the diaphragm seal box;
depositing an abradable material layer on the diaphragm seal box after removing the diaphragm seal box from the gas turbine compressor assembly;
mounting a spray gun in relation to an engine disk of the gas turbine compressor assembly, the spray gun configured for cold-spraying a quantity of particles toward the engine disk at a velocity sufficiently high to cause at least a portion of the quantity of particles to adhere to the engine disk;
controlling the spray gun to deposit the quantity of particles on the engine disk to form a geometry that will abrade the abradable material layer during operation of the gas turbine compressor assembly to form an interstage seal;
controlling rotation of the engine disk within the gas turbine compressor assembly during the step of controlling the spray gun so that the geometry is formed by a plurality of layers of spray-deposited material and is fully dense near its centerline due to a peening action of subsequent ones of the layers; and
reinstalling the diaphragm seal box within the gas turbine compressor assembly so that the geometry aligns with the abradable material layer.

13. The method of claim 12 further comprising:
forming the geometry comprising a substantially triangular cross section.

14. The method of claim 13 further comprising:
forming the geometry having an aspect ratio of approximately 2 to 1.

15. The method of claim 12 further comprising:
controlling the spray gun to form at least two parallel ridges on the engine disk each of the at least two parallel ridges having a substantially triangular cross section.

16. The method of claim 12 further comprising:
controlling the spray gun to form at least two parallel ridges on the engine disk each of the at least two parallel ridges having a height of about 6 to 7 millimeters and a width of about 2 to 3 millimeters.

17. A method comprising:
depositing a layer of abradable material on a diaphragm seal box of a gas turbine compressor assembly; and
forming a ridge around an outer circumference surface of an engine disk of the gas turbine compressor assembly by cold-spraying particles onto the surface in a plurality of layers, a width of each respective layer being smaller than a preceding layer such that the ridge takes a knife-edge shape, a number of the plurality of layers selected to cause the ridge to be fully dense near its centerline due to a peening action of subsequent layers;
the abradable material and ridge cooperating to form a seal when the gas turbine is operated.

* * * * *